MULTI-STAGE BINARY-CODED-DECIMAL TO DECIMAL CONVERSION MEANS HAVING PARALLEL INPUT AND SERIAL OUTPUT

Filed Feb. 9, 1962

INVENTOR.
ERNIE G. NASSIMBENE

BY John L Jackson

ATTORNEY

United States Patent Office 3,199,099

Patented Aug. 3, 1965

3,199,099
MULTI-STAGE BINARY-CODED-DECIMAL TO DECIMAL CONVERSION MEANS HAVING PARALLEL INPUT AND SERIAL OUTPUT

Ernie G. Nassimbene, San Jose, Calif., assignor to International Business Machines Corporation, New York, N.Y., a corporation of New York Filed Feb. 9, 1962, Ser. No. 172,302
5 Claims. (Cl. 340—347)

This invention relates to conversion means in general, and more particularly to a conversion device including a plurality of selectively energizable stages each connected to an associated input line which, upon interrogation, furnishes a series of output pulses indicative of the last stage to receive an input.

In many applications there exists a need of identifying the particular output line of a plurality of output lines which has an output on it at a selected time and, a further need to convert this information into a serial signal indicative of the particular line which had the output on it. The problem is often complicated by the output on the lines continuously changing prior to interrogation, and difficulty therefore exists in assuring that only the last energized line will be identified by the serial output pulses.

One such application is in the field of binary-coded-decimal to decimal converters wherein the binary coded decimal notation to be converted is fed into a plurality of gates each corresponding to a particular decimal value. Upon interrogation of the plurality of gates, only one of which will be true at the time of interrogation, a series of output pulses indicative of the decimal value of the gate which is true is obtained.

Likewise, when using a keyboard having a plurality of columns of keys, usually only the last key struck in a given column should provide an output upon interrogation. And again, it is often desirable, upon interrogation of the keyboard, to obtain a series of pulses indicative of the particular key in the column which was last struck.

An object of the present invention is to provide a novel converter which accepts an input along any one of a plurality of input lines and which, upon interrogation, furnishes a serial output signal indicative of the input signal.

Another object of the present invention is to provide a converter which accepts continuously changing inputs along a plurality of input lines and, upon interrogation, furnishes a series of output pulses indicative of the particular input line which had an input on it at the time of interrogation.

Another object of the present invention is to provide a converter, which accepts input signals from a plurality of input lines and provides a series of output pulses indicative of the last received input signal, which is relatively inexpensive and highly reliable, both due to the fact that component tolerances in the converter are not stringent, thereby allowing relatively inexpensive components to be used without resultant loss of reliability.

Figure 1:
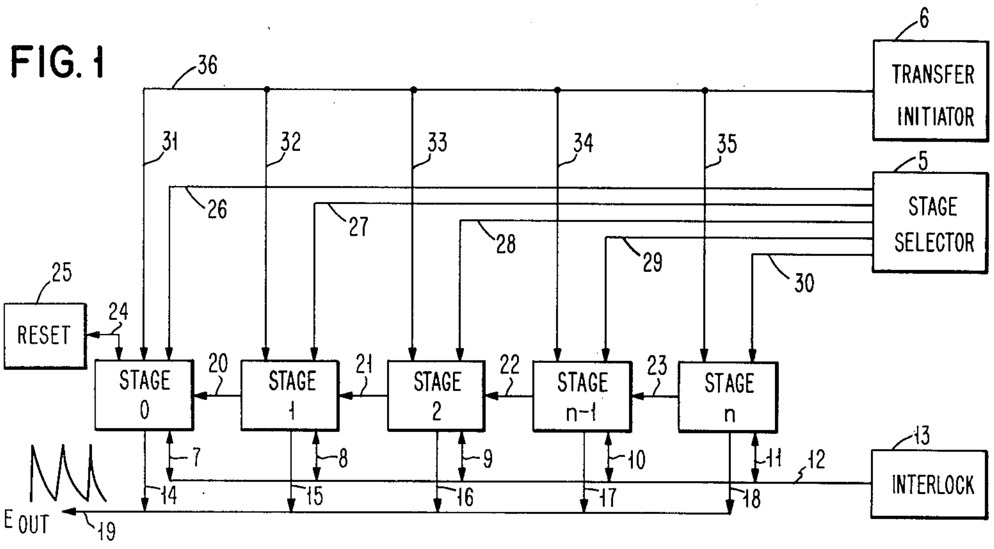
Figure 2:
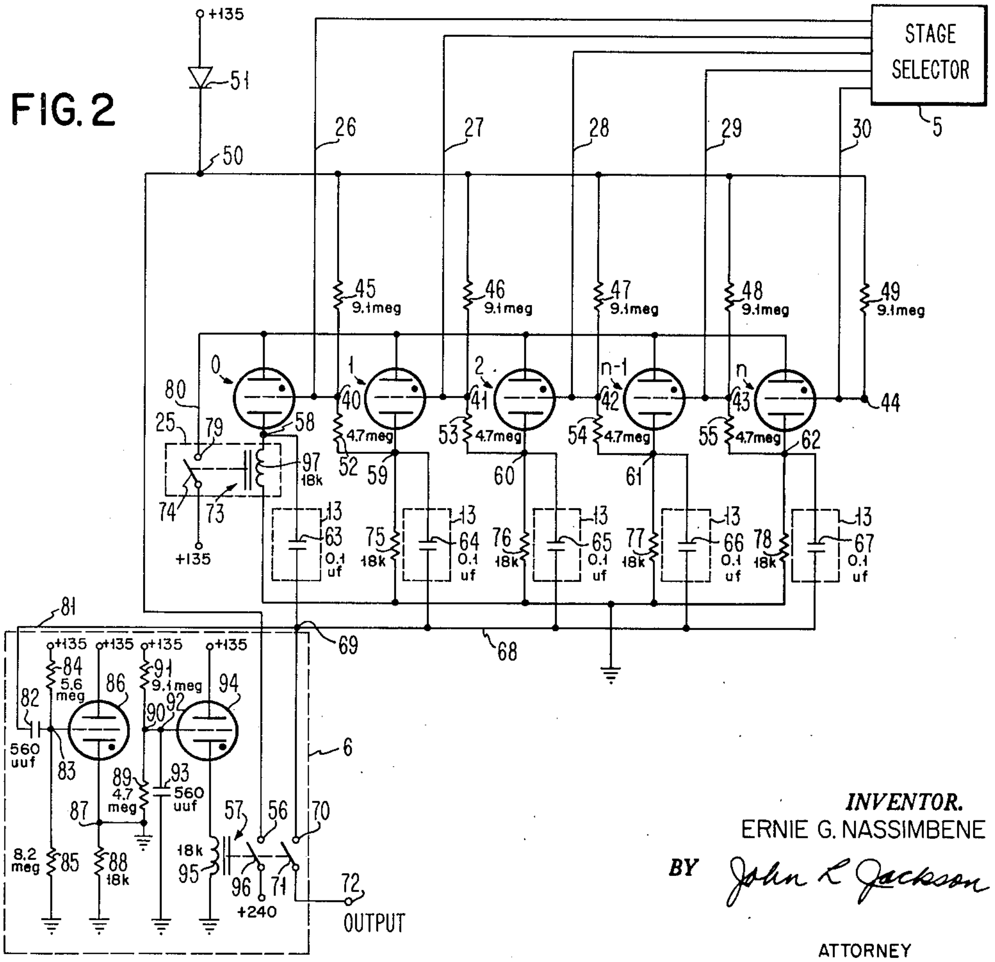

The foregoing and other objects, features and advantages of the invention will be apparent from the following more particular description of a preferred embodiment of the invention, as illustrated in the accompanying drawings in which:

FIG. 1 is a functional block diagram of the herein described converter shown under a control of a transfer initiator and stage selector; and FIG. 2 is a schematic of the converter of FIG. 1 and a schematic of a particular type of transfer initiator which has been shown to be ideally suited for use in conjunction with the converter in keyboard type applications.

Briefly, the preferred embodiment of the subject invention includes a plurality of selectively energizable stages interlocked such that only the last of said stages in point of time to be energized remains energized and inter-connected for sequential operation such that upon interrogation the stage preceding the stage which is energized becomes energized and produces an output pulse which turns off the stage which was energized, the stage preceding the stage which is then energized becomes energized thus producing an output pulse, etc., until the last stage is energized which resets the converter. A series of output pulses indicative of the particular stage which was energized at the time of interrogation is thus provided.

In the following description when the term "neons" is used, it should be understood that reference to "neon tubes" is intended.

Refer first to FIG. 1 wherein the novel converter is shown under control of a stage selector 5 and a transfer initiator 6. The converter comprises a plurality of stages 0, 1, 2, $n-1$ and $n$, each connected by means of lines 7 through 11, respectively, to an interlock line 12. The interlock line 12 in turn connects each of the stages to an interlock means 13. Each stage 0 through $n$ has an output line 14 through 18, respectively, connected to the converter output line 19. Each stage is also connected to its preceding stage by lines 20 through 23 while stage 0, which is the lowest order stage, is connected along line 24 to a reset means 25.

Each of the stages 0 through $n$ is connected by means of lines 26 through 30, respectively, to the stage selector 5 for selective energization of the stages. The stage selector 5 corresponds to a keyboard while lines 26 through 30 correspond to the outputs from the various keys in a keyboard type application. Stage selector 5 also corresponds to the plurality of gates and lines 26 through 30 correspond to the outputs from each of the gates in a binary coded decimal to decimal converter type application.

Each of the stages 0 through $n$ is also tied by means of lines 31 through 35 to transfer line 36, which in turn is tied to the transfer initiator 6. Again, the transfer initiator 6 comprises no part of the present invention and is included merely to show that some means of initiating transfer from stage to stage to produce the series of output pulses as will hereinafter be described must be included. The transfer initiator 6 controls the particular time at which the information content of stages 0 through $n$ is to be interrogated to produce the series of output pulses indicative of the particular stage which was energized at the time of interrogation.

In operation the stage selector 5, along lines 26 through 30, selectively energizes the stages 0 through $n$. As previously mentioned, the stage selector 5 may correspond to a keyboard, the keys of which are tied to stages 0 through $n$ along lines 26 through 30. Also, as previously mentioned, only one stage can be energized at a time since energization of a stage de-energizes any other stage which was previously energized such that in the keyboard application only the stage connected to the last key struck remains energized due to the action of the interlock 13 which is connected to all of the stages 0 through $n$. Assume for purposes of illustration that, at the time of interrogation, stage 2 is energized. Interrogation is under control of the transfer initiator 6 which again, as previously mentioned, is merely a means of applying a potential to the stages 0 through $n$ responsive to a command from an external source. Upon receipt of the interrogation signal along lines 36 and 32, stage 1 emits an output pulse along lines 15 and 19 which de-energizes stage 2. Stage 1 at the same time also emits an output pulse along line 20 to energize stage 0. Stage 0 then emits an output pulse along lines 14 and 19 which de-energizes stage 1. Stage 0 at the same time emits an output pulse along line 24 to the reset mechanism 25. The reset mechanism, a predetermined time later, de-energizes stage 0 thereby clearing the converter for another operation.

Refer next to FIG. 2 wherein shown a schematic diagram of the converter of FIG. 1 as well as a schematic diagram of one type of transfer initiator 6 which has proven to be suited for use in a keyboard type application to initiate the interrogation of the converter automatically a predetermined time after energization of a stage.

In FIG. 2 is shown a stage selector 5 connected along lines 26 through 30 to the control or center electrodes of three element neons 0 through *n*. In the hereinafter described circuit with the components having values as shown, neons having electrical characteristics are used such that application of less than 160 volts potential across the upper and lower electrodes will not cause ionization, while a momentary application of 114 volts on the center electrode with respect to either of the outer electrodes will cause the neon to fire and ionization will be sustained thereafter with 80 volts from the upper to lower electrodes.

The center electrode of the neons 0 through *n* are connected to junctions 40 through 44, respectively, which in turn are connected to one side of the 9.1 megohm resistors 45 through 49, respectively. The other sides of resistors 45 through 49 are connected through junction 50 and diode 51 to a +135 volt potential. Junctions 40 through 44 are also connected through resistors 45 through 49 to a fired contact 56 of normally open relay 57. The armature 96 of relay 57 is connected to a +240 volt potential. Junctions 40 through 43 are also connected through 4.7 megohm resistors 52 through 55, respectively, to junctions 59 through 62, respectively. Junctions 59 through 62 are in turn connected to the lower electrodes of neons 1 through *n*, respectively. The lower electrode of neon 0 is connected to junction 58. Junctions 58 through 62 are each connected to one side of the 0.1 $\mu$f. capacitors 63 through 67, the other side of which are all connected to line 68. Line 68 is in turn connected to junction 69, which in turn is connected to the fixed contact 70 of the normally open relay 57. The armature 71 of the normally open relay 57 is connected to the output terminal 72.

Junction 58 is connected to one side of relay winding 97 of relay 73, while the other side thereof is connected to ground. Winding 97 has a resistance of 18 kilohms. Junctions 59 through 62 are connected through 18 kilohms resistors 75 through 78 to ground.

The armature 74 of the normally closed relay 73 is connected to a +135 volt potential while the fixed contact 79 is connected along line 80 to all of the upper electrodes of neons 0 through *n*.

Junction 69 is connected along line 81 to one side of a 560 $\mu\mu$f. capacitor 82, the other side of which is connected to junction 83. Junction 83 is in turn connected through the 5.6 megohm resistor 84 to a +135 volt potential. Junction 83 is also connected through the 8.2 megohm resistor 85 to ground, and the center electrode of neon 86. The upper electrode of neon 86 is connected to a +135 volt potential while the lower electrode thereof is connected to junction 87. Junction 87 is also connected through the 18 kilohms resistor 88 to ground and through the 4.7 megohm resistor 89 to junction 90. Junction 90 is connected through the 9.1 megohm resistor 91 to a +135 volt potential and junction 92. Junction 92 is connected to one side of a 560 $\mu\mu$f. capacitor 93, the other side of which is connected to ground, and also connected to the center electrode of neon 94. The upper electrode of neon 94 is connected to a +135 volt potential while the lower electrode is connected through the 18 kilohm winding 95 of relay 57 to ground.

In operation, when there is no input from the stage selector 5 to the center electrodes of the neons 0 through *n* the center electrodes are at +50 volts due to the voltage division of the +135 volt potential through resistors 45 through 49 and resistors 52 through 55, respectively. At the same time a potential of +135 volts is being applied through the armature 74 and fixed contact 79 of the normally closed relay 73 and line 80 to the upper electrode of all of the neons 0 through *n*. Thus, the neons will not fire since, for ionization to take place, either the potential difference between the outer electrodes must be greater than 160 volts or, while one outer electrode is grounded and the other held at a potential of 135 volts, a potential of 114 volts or greater is applied to the center electrode. Assume now that the stage selector 5 applies a +70 volt pulse along line 28 to the center electrode of neon 2. The center electrode of neon 2 is thus raised to a 120 volt potential with respect to the grounded lower electrode and ionization takes place. Ionization will continue after the +70 volt potential has been removed from line 28 due to the 135 volt potential difference across the outer electrodes of the neon 2. Conduction in neon 2 causes junction 60 to rise from 0 to +50 volts causing a 50 volt pulse to be developed through capacitor 65 which appears on line 68, but is prevented from appearing on the output terminal 72 since armature 71 of normally opened relay 57 is open. This 50 volt pulse also passes along line 81 to charge capacitor 82, which in turn is connected to the center electrode of neon 86. Neon 86 will, therefore, fire after neon 2 has fired since point 83 which is normally biased at +85 volts due to the voltage divider action of resistors 84 and 85, is now raised to +135 volts. Likewise, when neon 86 fires a +50 volt pulse is applied to the normally +85 volt biased center electrode of neon 94 which fires causing current to flow from the +135 volt source connected to its upper electrode down through the relay winding 95 of relay 57 to ground, thereby energizing relay 57 to close normally open armatures 96 and 71. Contact of armature 96 with fixed contact 56 will apply the +240 volt potential to junction 50 which is connected through resistors 45 through 49 to the center electrode of the neons 0 through *n*, respectively. Operation of relay 57 also causes armature 71 to come in contact with fixed contact 70, thereby tying junction 69 to the output terminal 72.

When neon 2 came on, thus raising the potential at junction 60 to +50 volts, the center electrode of neon 1 was raised +35 volts which, added to the potential supplied by the +135 volt source through resistor 46, makes +85 volts on the center electrode of neon 1. Application of the +240 volt potential through armature 96 and fixed contact 56 to junction 50 results in a potential rise of 35 volts at junction 41 and, consequently, the center electrode of neon 1 rises to +120 volts thereby causing it to fire.

Upon application of the +240 volt potential to the center electrode of the neons, only the neon preceding the neon which was on will fire due to the interconnection of the lower electrode of the neon to the center electrode of the preceding electrode. When neon 1 fires, the junction 59 rises to +50 volts and a 50 volt pulse is developed across capacitor 64, and is applied to line 68. This pulse then passes through the fixed contact 70 and armature 71 to the output terminal 72. This pulse also passes along line 68 and through capacitor 65 to the lower electrode of neon 2. Since the lower electrode of neon 2, due to its conduction is already at about +50 volts, the 50 volt pulse causes the lower electrode to rise to around 100 volts thereby extinguishing ionization in neon 2. The center electrode of neon 0, prior to neon 1 firing, was at +85 volts and thus, when neon 1 fires raising the potential at junction 59 to +70 volts, neon 0 will fire since its center electrode rises to +120 volts. When neon 0 fires, a +50 volt pulse is developed across capacitor 63 and appears on the output terminal 72. This +50 volt pulse also passes along line 68 through capacitor 64 to the lower electrode of neon 1, thereby raising its potential to +100 volts to extinguish ionization in neon 1.

When neon 0 fires, current flows from the upper electrode down through the lower electrode, through winding 97 to ground, thereby energizing normally closed relay 73 to momentarily disconnect the +135 volt potential applied to the upper electrodes of neons 0 through $n$ to extinguish ionization in neon 0. The converter is then ready for reapplication of an input from the stage selector 5.

As is obvious from a consideration of the above description, it can be seen that if a pulse is erroneously applied by the stage selector to a given stage, and later a correction is desired, a pulse need only be applied to the center electrode of the correct neon, and due to the interlock feature provided by the capacitors 63 through 67, all of the other stages will be extinguished.

While there has been provided a transfer initiator 6, which energizes relay 57 a predetermined time after receipt of the first output pulse on line 68, it will, of course, be obvious that in many applications this automatic transfer initiation will not be desirable, and application of the +240 volt potential to junction 50 will be under control of some external controlling device. Thus, a relay might be provided to apply the +240 volts to junction 50 upon the receipt of a transfer command from an associated computer. Likewise, while armature 71 and its contact 70 have been provided to prevent pulses appearing on line 68 from appearing on the output terminal 72 prior to the energization of relay 57, it will, of course, be obvious that in many applications some other sort of device for blocking off the output terminal 72 prior to readout may be utilized.

In summary, I have provided a converter which includes a plurality of selectively energizable neon stages interlocked such that only the last of the stages to be energized is effective for readout. Selective energization of one stage conditions the preceding stage such that upon receipt of an interrogation signal the preceding stage is fired which produces an output signal which fires the next preceding stage and extinguishes any other stage then energized. The output pulses produced by the firing of each stage are thus indicative of the particular stage which was conducting upon the receipt of the interrogation signal.

While the invention has been particularly shown and described with reference to preferred embodiments thereof, it will be understood by those skilled in the art that various changes in form and details may be made therein without departing from the spirit and scope of the invention.

What is claimed is:

1. A converter for use with an associated stage selecting means having an output on one of a plurality of output lines to convert, under control of transfer initiating means, the output of the stage selecting means to a series of pulses indicative of the particular output line having an output on it at the time of transfer initiation comprising:
   - a converter serial output line,
   - a plurality of energizable stages,
   - one energizable stage which produces a pulse on said converter serial output line upon energization connected to each of said output lines for energization thereby,
   - interlock means connected to said stages such that only the stage last energized remains energized,
   - transfer means connected to all of said stages responsive to said transfer initating means operable to cause energization of a number of said energizable stages upon initiation of transfer which number is indicative of the output line then having an output on it, and
   - reset means connected to at least one of said stages.

2. A converter for use with an associated stage selecting means having an output on one of a plurality of output lines to convert, under control of transfer initiating means, the output of the stage selecting means to a series of pulses indicative of the particular output line having an output on it at the time of transfer initation comprising:
   - a converter serial output line,
   - a plurality of energizable stages,
   - one energizable stage which produces a pulse upon said converter serial output line upon energization connected to each of said output lines for energization thereby,
   - said stages being sequentially connected progressing from a lowest order stage to highest order stage,
   - interlock means connected to said stages such that only the stage last energized remains energized,
   - transfer mean responsive to the said transfer initiating means connected to all of said stages for causing the lower order stages preceding the stage which is energized at the time of transfer initiation to sequentially energize, and
   - reset means connected to said lowest order stage.

3. A converter for use with an associated stage selecting means having an output on one of a plurality of output lines to convert, under control of transfer initiating means, the output of the stage selecting means to a series of pulses indicative of the particular output line having an output on it at the time of transfer initiation comprising:
   - a converter serial output line,
   - a plurality of three element neon tubes each having a center element and first and second outer elements,
   - means for biasing the outer elements of all of said neon tubes such that application of a pulse of a predetermined magnitude to the center element of a neon tube will cause it to fire,
   - one of said output lines tied to each of said center elements for application of pulses thereto,
   - means for coupling all of said second outer elements to the converter serial output line,
   - said transfer means connected to the center elements of each of said neon tubes,
   - said neon tubes being serially interconnected progressing from a lower to higher order such that application of a transfer signal to the center elements of said neon tubes will cause the neon tube immediately preceding the neon tube which was conducting at the time of application of the transfer signal to fire and thereby initiate a sequential firing of all of the preceding lower order neon tubes, and
   - reset means operable to extinguish conduction in all of said neon tubes.

4. A converter for use with an associated stage selecting means having an output on one of a plurality of output lines to convert, under control of transfer initiating means, the output of the stage selecting means to a series of pulses indicative of the particular output line having an output on it at the time of transfer initiation comprising:
   - a converter serial output line,
   - a plurality of three element neon tubes each having a center element and first and second outer elements,
   - a potential of sufficient magnitude removably applied to all of said first outer elements while all of said second outer elements are tied to ground such that application of a pulse of predetermined magnitude to the center element of a neon tube will cause it to fire,
   - each of said center elements being connected to one of said output lines for application of pulses thereto and through a resistor to said transfer initiating means,
   - capacitors connecting all of said second outer elements to the converter serial output line,
   - said neon tubes being further sequentially connected with the center element of each neon tube connected through a resistor to the second outer element of the following stage to provide a series of neon tubes progressing from a lower to a higher order, and a relay having its winding connected between the said second outer element of said lowest order neon tube and ground operable to momentarily remove the potential applied to all of said first outer elements upon the firing of said lowest order neon tube.

5. A converter for use with an associated stage selecting means having an output on one of a plurality of output lines, only one of which will have an output on it at any given time, to convert, under control of transfer initiating means, the output of the stage selecting means to a series of pulses indicative of the particular output line having an output on it at the time of transfer initiation comprising:

a converter serial output line, a plurality of three element neon tubes each having a center element and first and second outer elements, all of said second outer elements being connected through resistances to ground, all of said first outer elements being removably connected to a positive potential of sufficient magnitude to sustain ionization between the first and second outer elements, a bias potential applied to the center elements of all of said neon tubes, one of said output lines being connected to the center element of each of said neon tubes, said transfer initiator connected to the center elements of each of said neon tubes, said neon tubes being sequentially connected in ascending order with the center element of each neon tube connected to the said second outer element of the following neon tube, capacitor means connecting each of said second outer elements to the converter output line, and means connected to each of said first outer elements operable upon conduction in the lowest order neon tube to remove the said positive potential applied thereto.

References Cited by the Examiner

UNITED STATES PATENTS

| | | | |
|---|---|---|---|
| 2,820,153 | 1/58 | Woll | 307—88.5/9 |
| 2,840,705 | 6/58 | Scully | 328—104 |
| 3,021,450 | 2/62 | Jiu. | |

ARTHUR GAUSS, *Primary Examiner.*

JOHN W. HUCKERT, *Examiner.*